Oct. 14, 1952 J. C. PARSON 2,613,686
FLOAT OPERATED MEASURING VALVE
Filed Sept. 6, 1947
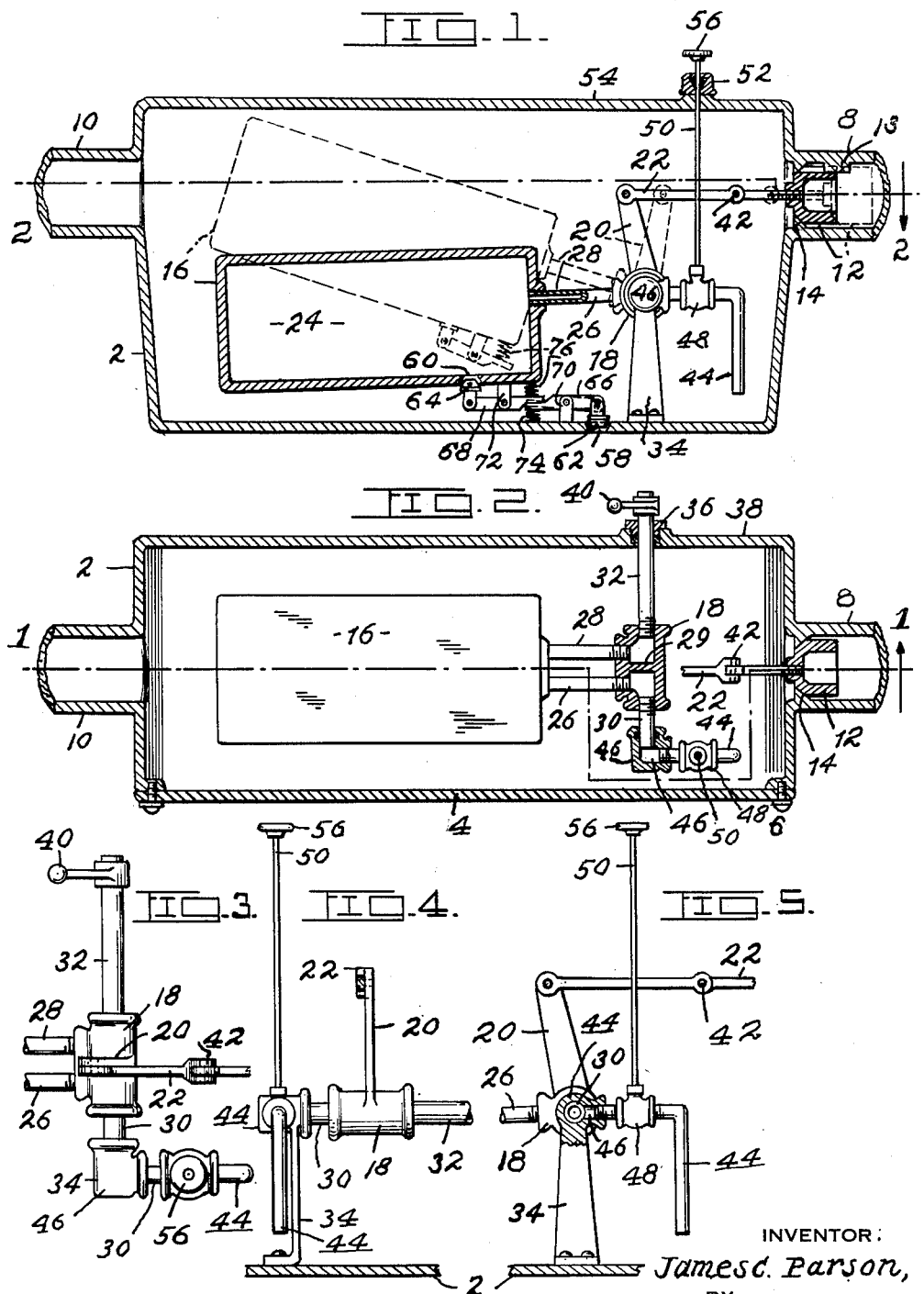
INVENTOR:
James C. Parson,
BY
F. G. Fischer,
ATTORNEY.

Patented Oct. 14, 1952

2,613,686

UNITED STATES PATENT OFFICE 2,613,686

FLOAT OPERATED MEASURING VALVE

James C. Parson, Kansas City, Kans.

Application September 6, 1947, Serial No. 772,535

8 Claims. (Cl. 137—404)

1

My invention relates to improvements in measuring valves and important features of the invention reside in an improved valve mechanism which may be adjusted to permit any predetermined volume of water or other fluid to flow through the valve before being automatically shut off; to provide novel means for setting the valve for the delivery of any desired volume of water or other fluid; and to provide means for automatically draining the valve after it has automatically closed, so that no water or other fluid will be left in the valve to freeze in cold weather.

Large livestock yards are divided into pens provided with watering troughs for supplying the enclosed livestock with water. Water is usually admitted to the troughs through valves which must be both manually opened and closed, but as some time is required to fill the troughs many valves are neglected and left open, with the result that thousands of gallons of water are wasted before the valves are closed. By the use of my valve which is set to automatically close after a predetermined volume of water has been delivered thereby, wastage of water is prevented and the cost thereof is saved.

A further object of the invention is to utilize air and water in regulating the rate of flow through the valve, thereby providing a simple, inexpensive valve of few parts, instead of employing complicated mechanism for regulating the flow of water through the valve.

Other objects will hereinafter appear and in order that the invention may be fully understood, reference will now be had to the accompanying drawing, in which—

Fig. 1 is a longitudinal section on line 1—1 of Fig. 2 showing the valve closed in full lines, and open in dotted lines.

Fig. 2 is an irregular horizontal section on line 2—2 of Fig. 1.

Figs. 3 to 5, inclusive, are enlarged details of parts employed in carrying out the invention.

Referring in detail to the different parts comprising the valve, 2 designates a case, to the interior of which access may be had through a removable side plate 4 secured to the body of the case by suitable means such as cap-screws 6. The case 2 is provided with an inlet 8 at one end and an outlet 10 at its opposite end, both of which are disposed near the top of the case so that the latter may almost fill with water before it flows from the outlet 10. The outer ends of the inlet 8 and the outlet 10 may be formed in any approved manner for connection to a supply pipe and a trough, respectively, not shown.

2

Water is admitted into the case 2 through the inlet 8 by a main valve 12 held from turning axially by a guide 13 formed integral with the interior of the inlet 8. The valve 12 is normally held against its seat 14 by mechanism including a float 16, a coupling 18, a crank 20 and a connecting-rod 22. The float 16 has a chamber 24 therein communicating at its upper portion with the coupling 18 through two tubes 26 and 28, whereby the float 16 and the coupling 18 are connected. The coupling 18 has a partition 29 therein between the adjacent ends of the tubes 26 and 28 and is connected at its opposite ends to tubular trunnions 30 and 32, journaled in an elbow 46 and a stuffing-box 36, respectively. The elbow 46 is fixed to the upper end of a standard 34, secured at its lower end to the bottom of the case 2, and the stuffing-box 36 is located in a side wall 38 of the case, as shown by Fig. 2. The outer end of the trunnion 32 is provided with a manual lever 40, whereby it can be turned axially to the right to open the main valve 12.

The crank 20 is fixed at its lower end to the coupling 18 and operably connected at its upper end to the valve 12 by the connecting rod 22, which is provided intermediate its ends with a pivotal joint 42 so that when one end moves in an arc with the upper end of the crank 20, the other end may move in a straight line with the valve 12.

A small tube 44 leads from the lower portion of the valve case 2 to the upper part of the standard 34 which has an elbow 46, communicating with the trunnion 30 and the tube 26 to permit water to flow from the case 2 to the float chamber 24.

Means are provided for automatically draining the case 2 and the float chamber 24, to prevent water from being left therein to freeze during cold weather. As shown by Fig. 1, such means consist of outlets 58 and 60 in the bottoms of the case 2 and the float 16 and drainage valves 62 and 64 for controlling said outlets, respectively. The valves 62 and 64 are pivotally mounted at one end of levers 66 and 68, respectively, fulcrumed on members 70 and 72, secured to the bottom of the case and the float, respectively. The valves 62 and 64 are normally held in closed position by springs 74 and 76, respectively.

*Operation.*—When it is desired to supply water to the cattle tank connected to the outlet 10, lever 40 is swung to the right, Fig. 1, and then released. The foregoing operation opens the main valve 12 and swings the float 16 upward to the dotted line position, Fig. 1. Upward movement of the float 16 allows the drainage valves 62 and 64 to close so that water cannot escape from the case 2 or the float chamber 24, through ports 58 and 60, respectively. When the main valve 12 is opened, as above-mentioned, the water rushes through the inlet 8 on its way to the outlet 10 and quickly fills the case 2. The incoming water sustains the float 16 in raised position until the chamber 24 receives enough water from the case to cause the float 16 to move downward and close the main valve 12.

The time elapsing between the opening and closing of valve 12 is sufficient to permit the cattle tank to receive an ample supply of water for the cattle and an important feature of the instant invention resides in adjustable means for controlling the closing movement of the valve 12 after it has been opened. Such adjustable means may be modified as desired, but in the present instance resides in the means whereby a portion of the water in the case 2 is introduced into the float chambers 24. Such adjustable means, in the present instance, comprises the tube 44, valve 48, elbow 46, trunnion 30, coupling 18 and the tube 26. From the foregoing it is apparent that the rate at which the water enters the float chamber 24 may be regulated as desired by opening the valve 48 more or less. As the water enters chamber 24 air therein is displaced and escapes to atmosphere with any excess water through tube 28, coupling 18 and the tubular trunnion 32. Seating of the main valve 12 occurs simultaneously with the opening of the drainage valves 62 and 64, respectively.

From the foregoing description taken in connection with the accompanying drawing, it is apparent that I have provided an efficient valve with simple and effective controlling means, and while I have shown and described one form of the invention, I reserve the rights to such other forms and modifications thereof as properly fall within the scope of the invention as claimed.

Having thus described my invention, what I claim and desire to secure by Letters Patent, is:

1. In a measuring valve, in combination, a case having an inlet and an outlet for the passage of a liquid, a main valve normally closing the inlet, a hollow float mounted for up and down movement in the case, a pair of tubes supporting the float and communicating with the interior thereof, one tube being adapted to conduct liquid to the interior of the float and the other for conducting air and liquid from the interior of the float, means separating the inlet ends of the tubes, means operably supporting the tubes and adapted to admit liquid to one tube to be conducted to the hollow portion of the float, valve controlled means for regulating the flow of liquid from the case to the hollow float, manual means for operating the tube supporting means, and means operably connecting the main valve to the tube supporting means.

2. A measuring valve comprising a case having an inlet and an outlet, a valve normally closing the inlet, a hollow float mounted for up and down movement in the case, a pair of tubes supporting the float and communicating with the interior thereof, one tube being adapted to conduct liquid to the interior of the float and the other for conducting air from the interior of the float, a coupling connected to the tubes and provided with a partition separating the adjacent ends of said tubes, tubular trunnions to which opposite ends of the coupling are connected, supporting means in the case for one of said trunnions, the other trunnion extending through and supported by a side wall of the case, manual means on the outer end of the last-mentioned trunnion to actuate the same, and means operably connecting one of said trunnions to the valve to actuate the latter.

3. In a measuring valve, in combination, a case having an inlet and outlet, a valve for controlling the flow of liquid to the inlet, a crank, a connecting rod operably connecting the valve to the crank, a standard fixed in the case, means adapted to be partially rotated and journaled in the standard and a wall of the case, said means carrying the crank, means for partially rotating the first-mentioned means in one direction to effect the opening of the valve, and a float connected to the first-mentioned means to partially rotate the latter in a reverse direction to close the valve.

4. In a fluid measuring valve, in combination, a case having an inlet and an outlet, a valve for controlling the flow of liquid through the inlet, a float operably mounted in the case and provided with a chamber, means operably connecting the valve and said float and through the intermediary of which the valve is controlled by the float, means for swinging the float upward in the case, means including the last-mentioned means adapted to introduce liquid from the case into the float chamber, and means for controlling the flow of liquid to the float chamber.

5. A liquid measuring valve comprising a case having an inlet and an outlet adjacent the upper edge thereof, a valve for closing said inlet, a hollow float carried in said float for up and down movement, a mechanical linkage interconnecting said valve and said float in a manner such that said valve is opened as said float rises and closed as said float falls, manual means for raising said float whereby said valve is opened and liquid enters said case to buoy up said float, and a restricted passageway between said float and a point near the bottom of said case, whereby liquid is permitted to enter said float to cause said float to fall.

6. A liquid measuring valve comprising a case having an inlet and an outlet adjacent the upper edge thereof, a valve for closing said inlet, a hollow float carried in said float for up and down movement, said float being vented to the atmosphere adjacent the top thereof, a mechanical linkage interconnecting said valve and said float in a manner such that said valve is opened as said float rises and closed as said float falls, manual means for raising said float whereby said valve is opened and liquid enters said case to buoy up said float, and a restricted passageway between said float and a point near the bottom of said case, whereby liquid is permitted to enter said float to cause said float to fall.

7. A liquid measuring valve comprising a case having an inlet and an outlet adjacent the upper edge thereof, a valve for closing said inlet, a hollow float carried in said case for up and down movement, a mechanical linkage interconnecting said valve and said float in a manner such that said valve is opened as said float rises and closed as said float falls, manual means for raising said float whereby said valve is opened and liquid enters said case to buoy up said float, a restricted passageway interconnecting a point near the bottom of said case to the interior of said float whereby liquid is permitted to enter said float to overcome the buoyancy of said float, and a manually adjustable valve in said passageway.

8. A liquid measuring valve comprising a case having an inlet and an outlet adjacent the upper edge thereof, a valve for closing said inlet, a hollow float carried in said case for up and down movement, a mechanical linkage interconnecting said valve and said float in a manner such that said valve is opened as said float rises and closed as said float falls, manual means for raising said float whereby said valve is opened and liquid enters said case to buoy up said float, a restricted passageway interconnecting a point near the bottom of said case to the interior of said float whereby liquid is permitted to enter said float to overcome the buoyancy of said float, a normally closed valve in the bottom of said float, a normally closed valve in the bottom of said case, and mechanical means operable by the downward movement of said float in said case to open both of said last named valves.

JAMES C. PARSON.

REFERENCES CITED

The following references are of record in the file of this patent:

UNITED STATES PATENTS

| Number | Name | Date |
|---|---|---|
| 428,399 | Moore | May 20, 1890 |
| 616,995 | Wangelin | Jan. 3, 1899 |
| 661,980 | Hanson | Nov. 20, 1900 |
| 1,172,584 | Conrad | Feb. 22, 1916 |